United States Patent
Drenth et al.

(10) Patent No.: US 10,626,681 B2
(45) Date of Patent: *Apr. 21, 2020

(54) DRILL ROD HAVING INTERNALLY PROJECTING PORTIONS

(71) Applicant: BLY IP INC., Salt Lake City, UT (US)

(72) Inventors: Christopher L. Drenth, Burlington (CA); Jeffrey Hogan, Brampton (CA)

(73) Assignee: BLY IP INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,549

(22) Filed: Jun. 14, 2018

(65) Prior Publication Data

US 2018/0291692 A1    Oct. 11, 2018

Related U.S. Application Data

(63) Continuation of application No. 15/463,597, filed on Mar. 20, 2017, now Pat. No. 10,024,117, which is a
(Continued)

(51) Int. Cl.
*E21B 17/00* (2006.01)
*E21B 17/042* (2006.01)
(Continued)

(52) U.S. Cl.
CPC ............ *E21B 17/00* (2013.01); *E21B 17/042* (2013.01); *E21B 17/20* (2013.01); *F16L 15/006* (2013.01); *F16L 9/02* (2013.01)

(58) Field of Classification Search
CPC ......... E21B 17/10; E21B 17/04; E21B 17/042
See application file for complete search history.

(56) References Cited

U.S. PATENT DOCUMENTS 1,714,818 A   5/1929   Reed
1,932,427 A   10/1933  Stone
(Continued)

FOREIGN PATENT DOCUMENTS

CA   2954417 A1   1/2016
CN   2334868 Y    8/1999
(Continued)

OTHER PUBLICATIONS

International Search Report and Written Opinion dated Oct. 1, 2015 by the International Searching Authority for International Application No. PCT/US2015/040929, filed on Jul. 17, 2015 and published as WO 2016/001368 on Jan. 21, 2016 (Applicant—BLY IP, Inc.) (6 Pages).

(Continued)

*Primary Examiner* — Shane Bomar
(74) *Attorney, Agent, or Firm* — Ballard Spahr LLP

(57) ABSTRACT

Threaded drill string component having a hollow elongate body with a box end portion, an opposing pin end portion and a cylindrical mid-body portion that extends longitudinally between the respective box and pin end portions and has a variable wall diameter. The mid-body inner wall of the mid-body portion has at least one projecting portion or upset that is spaced from both the box and pin end portions and extends inwardly toward a central longitudinal axis of the hollow body and a plurality of troughs defined in the mid-body inner wall of the mid-body portion.

20 Claims, 4 Drawing Sheets

Related U.S. Application Data continuation of application No. 15/326,746, filed as application No. PCT/US2015/040929 on Jul. 17, 2015, now Pat. No. 9,932,775.

(60) Provisional application No. 62/026,399, filed on Jul. 18, 2014.

(51) Int. Cl.
*F16L 15/00* (2006.01)
*E21B 17/20* (2006.01)
*F16L 9/02* (2006.01)

(56) References Cited

U.S. PATENT DOCUMENTS

| | | | |
|---|---|---|---|
| 2,822,158 A | 2/1958 | Brinton | |
| 3,232,638 A | 2/1966 | Hollander | |
| 3,484,122 A | 12/1969 | Schellstede et al. | |
| 3,502,353 A | 3/1970 | Burns | |
| 3,537,518 A * | 11/1970 | Sullivan | E21B 21/10 137/515.7 |
| 3,830,319 A | 8/1974 | Van Der Wijden | |
| 4,745,975 A * | 5/1988 | Price | E21B 49/08 166/205 |
| 6,749,031 B2 | 6/2004 | Klemm | |
| 8,245,798 B2 * | 8/2012 | Nava | E21B 17/0426 175/293 |
| 9,932,775 B2 | 4/2018 | Drenth et al. | |
| 10,024,117 B2 | 7/2018 | Drenth et al. | |
| 2004/0244964 A1 | 12/2004 | Hall et al. | |
| 2010/0289318 A1 | 11/2010 | Le et al. | |
| 2013/0008642 A1 | 1/2013 | Robichaux et al. | |
| 2014/0182945 A1 | 7/2014 | Drenth et al. | |
| 2014/0182946 A1 | 7/2014 | Drenth et al. | |
| 2017/0191320 A1 | 7/2017 | Drenth et al. | |
| 2017/0204678 A1 | 7/2017 | Drenth et al. | |
| 2018/0187496 A1 * | 7/2018 | Kinsella | E21B 7/046 |
| 2019/0003265 A1 * | 1/2019 | McLaughlin | E21B 17/043 |

FOREIGN PATENT DOCUMENTS

| | | |
|---|---|---|
| CN | 101503949 A | 8/2009 |
| CN | 202249737 U | 5/2012 |
| CN | 202832279 U | 3/2013 |
| CN | 203669777 U | 6/2014 |
| CN | 204326992 U | 5/2015 |
| DE | 4211081 C1 | 9/1993 |
| EP | 0353180 A2 | 1/1990 |
| EP | 3169864 A1 | 5/2017 |
| GB | 1045795 A | 10/1966 |
| JP | H09257166 A | 9/1997 |
| PE | 01132017 A1 | 3/2017 |
| SU | 977686 A1 | 11/1982 |
| WO | WO-2006/030451 A1 | 3/2006 |
| WO | WO-2014/043505 | 3/2014 |
| WO | WO-2016/011368 A1 | 7/2014 |
| WO | WO-2016/001368 A1 | 1/2016 |

OTHER PUBLICATIONS

International Preliminary Report on Patentability dated Jan. 24, 2017 by the International Searching Authority for International Application No. PCT/US2015/040929, filed on Jul. 17, 2015 and published as WO 2016/001368 on Jan. 21, 2016 (Applicant—BLY IP, Inc.) (5 Pages).
Examination Report dated Oct. 16, 2017 by the Australian Patent Office for AU Application No. 2015289455, filed on Jul. 17, 2015 and published as AU 2015289455 A1 on Mar. 2, 2017 (Applicant—BLY IP, Inc.) (3 Pages).
Notice of Acceptance dated Oct. 3, 2018 by the Australian Patent Office for AU Application No. 2015289455, filed on Jul. 17, 2015 and published as AU 2015289455 A1 on Mar. 2, 2017 (Applicant—BLY IP, Inc.) (3 Pages).
First Office Action dated Nov. 29, 2017 by the Canadian Patent Office for CA Application No. 2954417, filed on Jul. 17, 2015 and published as CA 2954417 A1 on Jan. 21, 2016 (Applicant—BLY IP, Inc.) (3 Pages).
Second Office Action dated Oct. 11, 2018 by the Canadian Patent Office for CA Application No. 2954417, filed on Jul. 17, 2015 and published as CA 2954417 A1 on Jan. 21, 2016 (Applicant—BLY IP, Inc.) (3 Pages).
Office Action dated Sep. 11, 2018 by the Chilean Patent Office for CL Application No. 201700112, filed on Jul. 17, 2015 and published as CL 2017000112 A1 on Sep. 15, 2017 (Applicant—BLY IP, Inc.) (3 Pages).
Office Action dated Sep. 11, 2018 by the SIPO for CN Application No. 2015800389366, filed on Jul. 17, 2015 and published as CN 107075923 on Aug. 18, 2017 (Applicant—BLY IP, Inc.) (5 Pages).
European Search Report dated Feb. 19, 2018 by the European Patent Office for EP Application No. 15821397.5, filed on Jul. 17, 2015 and published as EP 3169864 on May 24, 2017 (Applicant—BLY IP, Inc.) (6 Pages).
Decision to Grant a Patent for Invention dated Feb. 2, 2018 by the Russian Patent Office for RU Application No. 2017105155, filed on Jul. 17, 2015 and granted as RU 2651650 on Apr. 23, 2018(Applicant—BLY IP, Inc.) (6 Pages).
Non Final Rejection dated Aug. 18, 2017 by the USPTO for U.S. Appl. No. 15/326,746, filed Jan. 17, 2017 now U.S. Pat. No. 9,932,775 on Apr. 3, 2018 (Inventor—Christopher L. Drenth) (8 Pages).
Response to Non Final Rejection dated Nov. 20, 2017 to the USPTO for U.S. Appl. No. 15/326,746, filed Jan. 17, 2017 now U.S. Pat. No. 9,932,775 on Apr. 3, 2018 (Inventor—Christopher L. Drenth) (9 Pages).
Final Rejection dated Dec. 8, 2017 by the USPTO for U.S. Appl. No. 15/326,746, filed Jan. 17, 2017 now U.S. Pat. No. 9,932,775 on Apr. 3, 2018 (Inventor—Christopher L. Drenth) (5 Pages).
Response to Final Rejection dated Jan. 18, 2018 to the USPTO for U.S. Appl. No. 15/326,746, filed Jan. 17, 2017 now U.S. Pat. No. 9,932,775 on Apr. 3, 2018 (Inventor—Christopher L. Drenth) (8 Pages).
Notice of Allowance dated Jan. 29, 2018 by the USPTO for U.S. Appl. No. 15/326,746, filed Jan. 17, 2017 now U.S. Pat. No. 9,932,775 on Apr. 3, 2018 (Inventor—Christopher L. Drenth) (8 Pages).
Notice of Allowance dated Mar. 1, 2018 by the USPTO for U.S. Appl. No. 15/326,746, filed Jan. 17, 2017 now U.S. Pat. No. 9,932,775 on Apr. 3, 2018 (Inventor—Christopher L. Drenth) (8 Pages).
Issue Notification dated Mar. 14, 2018 by the USPTO for U.S. Appl. No. 15/326,746, filed Jan. 17, 2017 now U.S. Pat. No. 9,932,775 on Apr. 3, 2018 (Inventor—Christopher L. Drenth) (1 Page).
Non Final Rejection dated Aug. 21, 2017 by the USPTO for U.S. Appl. No. 15/463,597, filed Mar. 20, 2017 now U.S. Pat. No. 10,024,117 on Jul. 17, 2018 (Inventor—Christopher L. Drenth) (8 Pages).
Response to Non Final Rejection dated Nov. 20, 2017 to the USPTO for U.S. Appl. No. 15/463,597, filed Mar. 20, 2017 now U.S. Pat. No. 10,024,117 on Jul. 17, 2018 (Inventor—Christopher L. Drenth) (9 Pages).
Final Rejection dated Dec. 27, 2017 by the USPTO for U.S. Appl. No. 15/463,597, filed Mar. 20, 2017 now U.S. Pat. No. 10,024,117 on Jul. 17, 2018 (Inventor—Christopher L. Drenth) (5 Pages).
Response to Final Rejection dated Jan. 18, 2018 to the USPTO for U.S. Appl. No. 15/463,597, filed Mar. 20, 2017 now U.S. Pat. No. 10,024,117 on Jul. 17, 2018 (Inventor—Christopher L. Drenth) (8 Pages).
Advisory Action dated Jan. 29, 2018 by the USPTO for U.S. Appl. No. 15/463,597, filed Mar. 20, 2017 now U.S. Pat. No. 10,024,117 on Jul. 17, 2018 (Inventor—Christopher L. Drenth) (3 Pages).
Response to Final Rejection dated Jan. 31, 2018 to the USPTO for U.S. Appl. No. 15/463,597, filed Mar. 20, 2017 now U.S. Pat. No. 10,024,117 on Jul. 17, 2018 (Inventor—Christopher L. Drenth) (7 Pages).

(56) References Cited

OTHER PUBLICATIONS

Notice of Allowance dated Mar. 15, 2018 by the USPTO for U.S. Appl. No. 15/463,597, filed Mar. 20, 2017 now U.S. Pat. No. 10,024,117 on Jul. 17, 2018 (Inventor—Christopher L. Drenth) (3 Pages).

Notice of Allowance dated May 29, 2018 by the USPTO for U.S. Appl. No. 15/463,597, filed Mar. 20, 2017 now U.S. Pat. No. 10,024,117 on Jul. 17, 2018 (Inventor—Christopher L. Drenth) (2 Pages).

Issue Notification dated Jun. 27, 2018 by the USPTO for U.S. Appl. No. 15/463,597, filed Mar. 20, 2017 now U.S. Pat. No. 10,024,117 on Jul. 17, 2018 (Inventor—Christopher L. Drenth) (1 Page).

Office Action dated Jul. 25, 2019 by the Canadian Patent Office for CA Application No. 2954417, filed on Jul. 17, 2015 and published as CA 2954417 A1 on Jan. 21, 2016 (Applicant—BLY IP, Inc.) (3 Pages).

* cited by examiner

DRILL ROD HAVING INTERNALLY PROJECTING PORTIONS

CROSS-REFERENCE TO RELATED PATENT APPLICATIONS

This application is a continuation of U.S. patent application Ser. No. 15/463,597, filed on Mar. 20, 2017, which is a continuation of U.S. patent application Ser. No. 15/326,746, filed Jan. 17, 2017, now U.S. Pat. No. 9,932,775, which is a National Phase Application of International Application No. PCT/US2015/040929, filed Jul. 17, 2015, which claims priority to and the benefit of the filing date of U.S. Provisional Patent Application No. 62/026,399, filed Jul. 18, 2014. Each of the above-identified applications is incorporated herein by reference in its entirety.

BACKGROUND OF THE INVENTION

Field

Implementations of the present invention relate generally to components and systems for drilling. In particular, implementations of the present invention relate to drill rods having at least one of reduced overall weight, increased strength, or resistance to jamming and/or wedging.

Relevant Technology

Drilling core samples (or core sampling) allows observation of subterranean formations within the earth at various depths for many different purposes. For example, by drilling a core sample and testing the retrieved core, scientists can determine what materials, such as petroleum, precious metals, and other desirable materials, are present or are likely to be present at a desired depth. In some cases, core sampling can be used to give a geological timeline of materials and events. As such, core sampling may be used to determine the desirability of further exploration in a particular area.

In drilling relatively deep wells, such as those which reach a depth of several hundred to several thousand feet deep, a plurality of drill rod sections, which typically have conventional lengths, are coupled end-to-end together in series to form a drill string. The connection between these drill rod sections is made by fasteners, usually threaded fasteners. One limitation on the drilling of relatively deep wells is the drill string weight, which of course becomes greater and greater as the well depth is increased. Historically, drill rod sections have been made of steel with a substantially constant internal diameter; but with the deeper wells now being drilled, the heavier drill strings can impose fatiguing loads on the component drill rod sections and on the equipment used to rotate and raise and lower the drill string.

In order to properly explore an area or even a single site, many core samples may be needed at varying depths. In some cases, core samples may be retrieved from thousands of feet below ground level. In such cases, retrieving a core sample may require the time consuming and costly process of removing the entire drill string (or tripping the drill string out) from the borehole. In other cases, a faster wireline core drilling system may include a core retrieval assembly that travels (or trips in and out of) the drill string by using a wireline cable and hoist.

In operation, the time to trip the core sample tube in and out of the drill string often remains a time-consuming portion of the drilling process. The slow tripping rate of the core retrieval assembly of some conventional wireline systems in a drill string formed from conventional drill rod may be caused by several factors. For example, the core retrieval assembly of some wireline systems may include a spring-loaded latching mechanism. Often the latches of such a mechanism may drag against the interior surface of the drill string and, thereby, slow the tripping of the core sample tube in the drill string. Additionally, because drilling fluid and/or ground fluid may be present inside the drill string, the movement of many conventional core retrieval assemblies within the drill string may create a hydraulic pressure that limits the rate at which the core sample tube may be tripped in and out of the borehole. The increased internal diameter of the drill rod of the present invention helps to reduce the impact of these factors and provides an increased efficiency in operation.

Accordingly, a need exists for improved drill rods that address one or more of the issues described above. For example, there is a need for drill rods that have reduced overall weight while maintaining or minimizing loss of stiffness in bending and twisting and loss of support against the bending and twisting of a drill string passing therethrough, as well as using available material effectively to increase drilling load capacity.

SUMMARY

It is to be understood that this summary is not an extensive overview of the disclosure. This summary is exemplary and not restrictive, and it is not intended to identify key or critical elements of the disclosure or delineate the scope thereof. The sole purpose of this summary is to explain and exemplify certain concepts of the disclosure as an introduction to the following complete and extensive detailed description.

One or more implementations of the present invention overcome one or more of the foregoing or other problems in the art with drilling components, tools, and systems that provide for effective and efficient drilling. In one aspect, one or more implementations of the present invention comprise a threaded drill string component that resists mid-body twisting.

In one aspect the threaded drill string component comprises a hollow elongate body having a box end portion and an opposing pin end portion. Each of the respective box and pin end portions have an end portion inner wall having a first inner diameter. In a further aspect, the hollow body further comprises a cylindrical mid-body portion that extends longitudinally between the respective box and pin end portions. The cylindrical mid-body portion has a mid-body inner wall having a variable wall diameter and a mid-body outer wall having a substantially constant outer diameter.

In another aspect, the mid-body inner wall of the mid-body portion can have at least one projecting portion having at least one male projection or upset that is spaced from both the box and pin end portions and extends inwardly toward a central longitudinal axis of the hollow body and a plurality of troughs defined in the mid-body inner wall of the mid-body portion. In one aspect, it is contemplated that the at least one male projection of each projecting portion has a male projection inner wall face that can have a second inner diameter, which can be equal to or greater than the first inner diameter.

In another exemplary non-limiting aspect, a first trough can extend from a distal end of the box end portion to a proximal end of the at least one male projection of a projecting portion and a second trough can extend from a distal end of the at least one male projection of the projecting portion to a proximal end of the pin end portion. In this aspect, each trough can comprise a substantially cylindrical portion having a first trough diameter that is greater than the respective first and second inner diameters.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
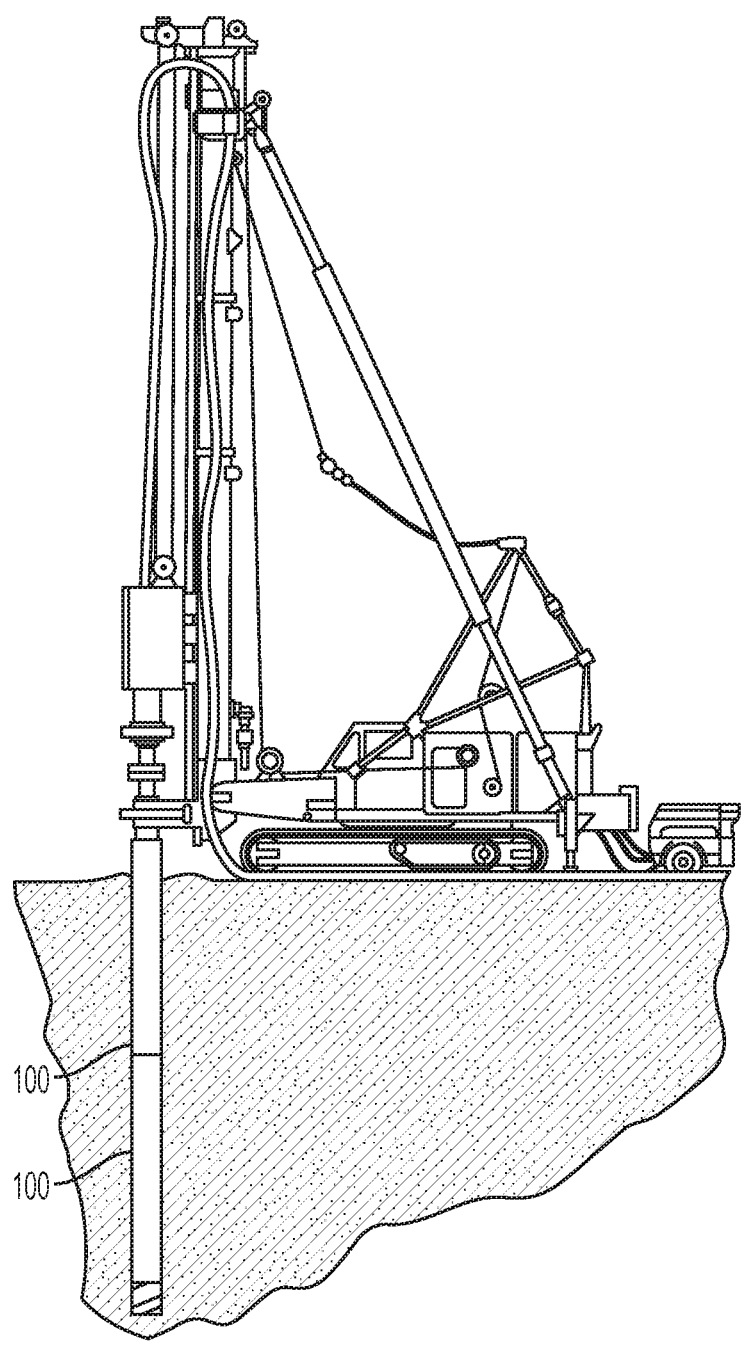
FIG. 1 illustrates a drilling system having a plurality of connected drill rods in a drill string in accordance with one or more implementations of the present invention.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. It is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description. Reference will now be made to the drawings to describe various aspects of one or more implementations of the invention. It is to be understood that the drawings are diagrammatic and schematic representations of one or more implementations, and are not limiting of the present disclosure. Moreover, while various drawings are provided at a scale that is considered functional for one or more implementations, the drawings are not necessarily drawn to scale for all contemplated implementations. The drawings thus represent an exemplary scale, but no inference should be drawn from the drawings as to any required scale.

In the following description, numerous specific details are set forth in order to provide a thorough understanding of the present disclosure. It will be obvious, however, to one skilled in the art that the present disclosure may be practiced without these specific details. In other instances, well-known aspects of drill string technology have not been described in particular detail in order to avoid unnecessarily obscuring aspects of the disclosed implementations.

In certain aspects, implementations of the present disclosure provide for improved drill string components that preserve load, torsional, and impact capacity while minimizing the weight of the drill string component. Additionally, it is contemplated that reducing the weight of each individual drill rod can allow for the subsequent increase in the capacity of a drilling system to manage more drill or coring rods, thereby increasing the overall drilling system depth capacity. For example, it is contemplated that a drill rated for 2500 m can manage a 3250 m drill string when using the drill rods disclosed. Further, it is contemplated that increasing the internal diameter of the drilling rod can allow the drilling system to be more efficient in tripping a core sample tube in and out of the drill string.

In other optional aspects, implementations of the present disclosure maintain a continuous metal exterior surface and, thus, avoid any abrasive wear of a composite lining positioned therein the troughs of the drill string components disclosed herein.

In other aspects, implementations of the present disclosure provide for more accurate drilling results by increasing the stiffness of the drill string components and, thus, the drill string. In light of the present disclosure, one skilled in the art will appreciate that the increased stiffness associated with the male projections provided in the drill string component can result in an increased stiffness of the drill string component. This increased stiffness can reduce the deflection of the drill string and, correspondingly, the drilled hole, thereby providing more accurate drilling results such as, for example and without limitation, improved blasting efficiency when drilling blast holes, improved targeting in mineral exploration, and the like.

Implementations of the present invention are directed toward drilling components, tools, and systems that provide for a threaded drill string component that resists mid-body twisting while minimizing the weight of the drill string component. Turning now to FIGS. 1-4, implementations of exemplary threaded drill string components are illustrated.

In one aspect the threaded drill string component or drill rod 100 comprises a hollow elongate body 10 having a box end portion 20, an opposing pin end portion 30 and a cylindrical mid-body portion 40 that extends longitudinally between the respective box and pin end portions. A central longitudinal axis LA extends through the hollow body 10 between the respective box and pin end portions 20, 30. Each of the respective box and pin end portions 20, 30 have an end portion inner wall 22, 32 having a first inner diameter D1. In one aspect, the end portion inner wall 22,32 can have a substantially cylindrical shape that is positioned uniformly about the central longitudinal axis. In a further aspect, the cylindrical mid-body portion 40 has a mid-body inner wall 42 having a variable wall diameter and a mid-body outer wall 43 having a substantially constant outer diameter. Although described herein as having the same inner diameter D1, it is contemplated that the inner walls 22, 32 of the box and pin end portions 20, 30 can optionally have different inner diameters.

In another aspect, the mid-body inner wall 42 of the mid-body portion can have at least one projecting portion having at least one male projection 44 or upset that is spaced from both the box and pin end portions 20, 30 and extends inwardly toward the central longitudinal axis LA of the hollow body 10 and a plurality of troughs 60 defined in the mid-body inner wall 42 of the mid-body portion 40. In one aspect, it is contemplated that each projection of the at least one male projection 44 has a male projection inner wall face 46 that can have a second inner diameter D2 that can be equal to or greater than the first inner diameter D1. In one aspect, the male projection inner wall face 46 can have a substantially cylindrical shape that is positioned uniformly about the central longitudinal axis LA. In this aspect, each male projection 44 can have, in a perpendicular plane bisecting the central longitudinal axis LA, a substantially torodial shape.

In another exemplary aspect, a first trough 60' of the plurality of troughs 60 can extend from a distal end 24 of the box end portion 20 to a proximal end 50 of the at least one male projection 44 and a second trough 60" of the plurality of troughs 60 can extend from a distal end 52 of the at least one male projection to a proximal end 34 of the pin end portion 30. In this aspect, each trough 60 can comprise a substantially cylindrical portion 62 having a first trough diameter that is greater than the respective first and second inner diameters. Each trough can also have a first frustoconical portion 64 that is sloped outwardly from the central longitudinal axis LA and extends between the respective distal end 24 of the box end portion 20 and proximal end 34 of the pin end portion 30 to the substantially cylindrical portion 62 and has a variable inner diameter that is greater than the first inner wall diameter D1. In an optional aspect, not shown, at least a portion of the substantially cylindrical portion of each trough 60 can further comprise a plurality of longitudinally extending ridges that extend inwardly toward the central longitudinal axis LA.

In a further aspect, a portion of each trough 60 adjacent to the at least one male projection 44 can comprise a second frustoconical portion 66 that is sloped inwardly from the central longitudinal axis LA and extends between the substantially cylindrical portion 62 of the mid-body portion and an edge 47 of the male projection inner wall face 46. It is contemplated that the first and second frustroconical portions 64, 66 can have any desired longitudinal cross sectional shape. In one example, and not meant to be limiting, at least a portion of each second frustoconical portion 66 can be linear in longitudinal cross-section and can be positioned at an acute angle β with respect to a perpendicular plane bisecting the central longitudinal axis LA. In one aspect, the acute angle β can be between about 0.01 to about 10 degrees; preferably less than about 8 degrees; and, more preferred, less than about 6 degrees. In exemplary aspects, the acute angle β can range from about 0.5 to about 8 degrees, from about 0.5 to about 6 degrees, from about 0.5 to about 5 degrees, from about 1 to about 7 degrees, from about 1 to about 6 degrees, from about 1 degrees to about 5 degrees, or from about 2 degrees to about 6 degrees.

In one aspect, it is contemplated that at least a portion of each second frustoconical portion 66 can be curvilinear in longitudinal cross-section. Similarly, it is contemplated that at least a portion of each first frustoconical portion 64 can be linear and/or curvilinear in longitudinal cross-section. In another aspect, at least a portion of each first frustoconical portion 64 can have a quarter sine wave shape in longitudinal cross-section with an amplitude equal to one-half of the first trough diameter.

In another aspect, at each first frustoconical portion 64, the inner diameter of the hollow body 10 can transition from the second inner diameter D2 of the male projection inner wall face 46 to the first trough diameter along a first longitudinal transition length L1. Similarly, at each second frustoconical portion 66, the inner diameter of the hollow body 10 can transition from the first inner diameter D1 of the respective box and pin end portions 20, 30 to the first trough diameter along a second longitudinal transition length L2. The total of the respective first and second transition lengths L1, L2 is less than about 15%, preferably less than about 12.5% and, more preferred, less than about 10% of the overall length of the drill rod.

In various exemplary aspects, the elongate length of the plurality of troughs can comprise greater than 60% of the elongate length of the mid-body portion; preferably greater than 70% of the elongate length of the mid-body portion, and more preferred, greater than 80% of the elongate length of the mid-body portion.

In a further aspect, it is contemplated that the transition from the second frustoconical portion 66 to the male projection inner wall face 46 can be chamfered. Similarly, it is contemplated that the transition from the second frustoconical portion 66 to the adjoining cylindrical portion of the mid-body portion 40 of the trough 60 can be chamfered.

Figure 2:
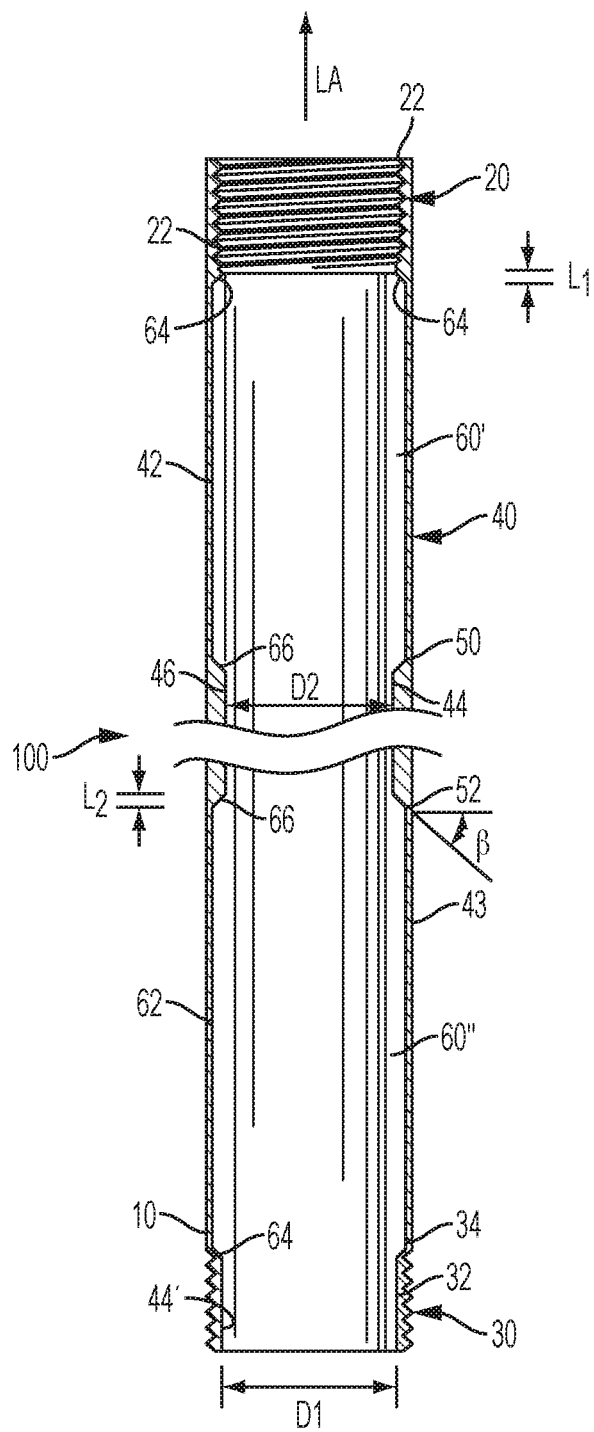
FIG. 2 is a cross-sectional view of an exemplary drill string component or drill rod having a single projecting portion (i.e., male projection) as disclosed herein.
Figure 3:
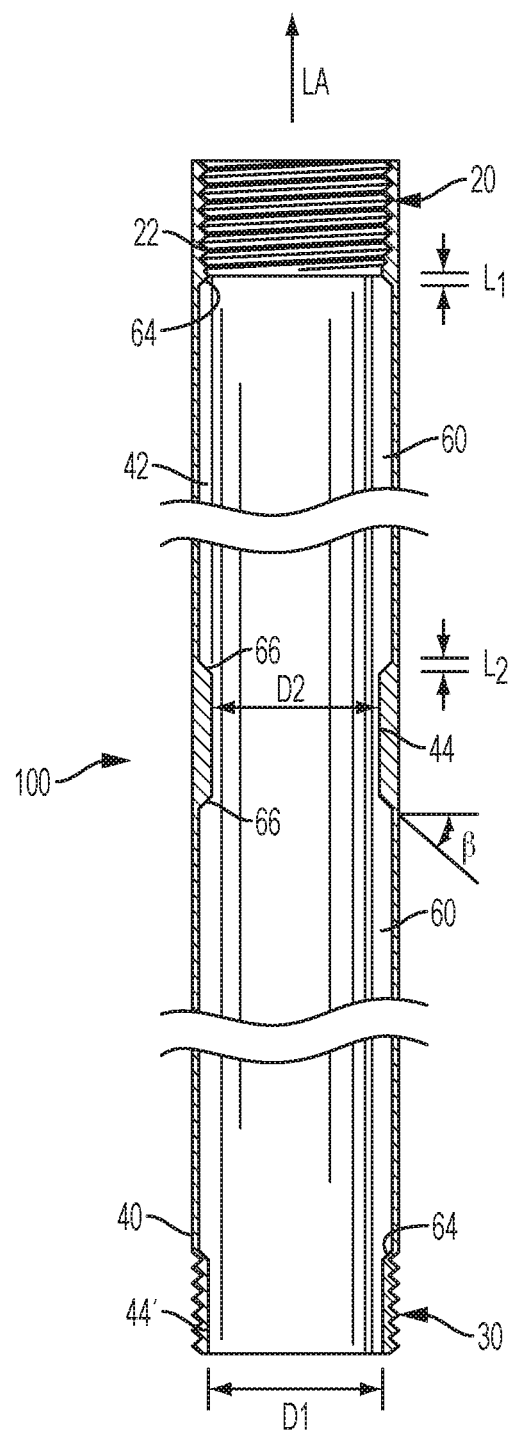
FIG. 3 is a cross-sectional view of an exemplary drill string component or drill rod as disclosed herein.

In another aspect, and as shown in FIGS. 2 and 3, it is contemplated that the at least one male projection 44 of each projecting portion can comprise a single male projection, which can optionally extend circumferentially about the central longitudinal axis LA. Alternatively, it is contemplated that the at least one male projection 44 of each projecting portion can comprise a plurality of circumferentially spaced male projections. Optionally, in exemplary aspects, the at least one projecting portion can comprise a single projecting portion (i.e., a single axial location with at least one male projection) that is positioned at a desired axial location in the mid-body portion. As one will appreciate from the above disclosure, it is contemplated that the respective end portion inner walls 22, 32 of the box and pin end portions 20, 30 can effectively act as an additional internal male projection or upset 44' that is located at the respective outer end portions of the hollow body 10 of the drill rod 100.

In one aspect, the axial spacing between sequential projecting portions (e.g., sequential axial locations with at least one male projection 44) and/or the axial spacing between the pin and box end portions 20, 30, 44' and a sequential projecting portion (e.g., at least one male projection 44), which effectively corresponds to the spacing between the internal upsets in the drill string component, can reflect a selected separation distance. For example and without limitation, when the drill string components disclosed herein are used as casings for other drill string components to be passed therethough, the selected separation distance (e.g., the spacing between sequential male projections 44 and/or the spacing between a male projection and the pin and box end portions 20, 30, 44') can be made relative to and as a percentage of the elongate length of the individual respective drill string components being passed therethrough. For example, if a drill string component being passed through the drill rod is 10 feet in length, then the selected separation distance would be less than 100% of the elongate length of the drill string component passing through the drill rod. In this aspect, it is contemplated that the selected separation distance can correspond to a distance that is less than about 90%, less than about 80%, less than about 70%, less than about 60%, less than about 50%, less than about 40%, or less than about 30% of the elongate length of the individual drill string components that are passed therethrough the hollow body 10 of the drill rod 100 (or other drill string component). In exemplary aspects, it is contemplated that the selected separation distance can range from about 1 foot to about 6 feet and more preferably, from about 2 feet to about 5 feet and, most preferably, from about 3 feet to about 5 feet. In further exemplary aspects, it is contemplated that the selected separation distance can be less than about 5 feet.

Figure 4:
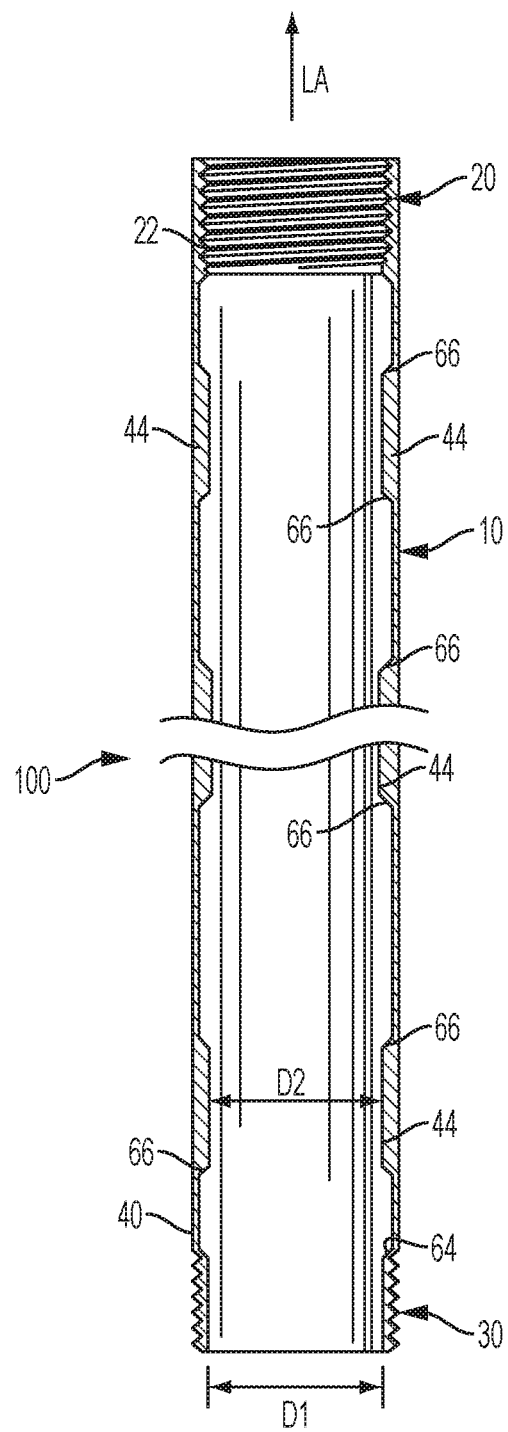
FIG. 4 is a cross-sectional view of an exemplary drill string component or drill rod having a plurality of axially spaced projecting portions (i.e., male projections) as disclosed herein.

In one example, and as shown in FIG. 4, a first projecting portion (e.g., a first axial location of at least one male projection 44) can be positioned substantially in the center of the mid-body portion 40. Optionally, when the at least one projecting portion comprises a plurality of projecting portions (e.g., a plurality of axially spaced locations of at least one male projection 44), the plurality of projecting portions can be spaced longitudinally along the mid-body portion 40. It is contemplated that the spacing can be substantially uniform or it can be varied as desired. In exemplary aspects, and as shown in FIG. 4, the plurality of projecting portions can comprise a pair of spaced projecting portions that are equidistantly spaced longitudinally along the mid-body portion from each other and from the respective internal male projection or upset 44' defined by the respective end portion inner walls 22, 32 of the box and pin end portions 20,30. In these aspects, each projecting portion can comprise at least one male projection 44 as disclosed herein. In these aspects, and as one skilled in the art will appreciate, the plurality of troughs 66 can comprise at least one trough that extends between any two spaced projecting portions (e.g., any two sequential axial locations of at least one male projection 44), to include the internal male projection or upset 44' defined by the respective end portion inner walls 22, 32 of the box and pin end portions 20, 30.

In other aspects, the drill string component 100 can have improved response under dynamic loading conditions over conventional drill rods. The typical dynamic response of steel drill strings under compression and high r.p.m. indicate that the torque impulse loads from the drill bit create torsion and bending load waves that can rapidly travel up and reflect back down the drill string. This dynamic response can magnify the impulse load by a factor of about 2 to about 3, and such magnification can exceed the elastic limit of the conventional drill rod. One skilled in the art will appreciate that exceeding the elastic limit of the conventional drill rod under these loading conditions can lead to permanent twisting and bending of the drill string which, in turn, can prevent productive drilling or even seizing of the drill string in the hole. However, these impulse loads are typically insufficient to overload the drill rod joints. Here, using the drill string component 100 described herein having a male projection(s) 44 positioned in the midbody portion 40 can allow for an increased resistance to bending by the component. Additionally, it is contemplated that, for applications in which the drill string component is being used as a casing for other drill string components to be passed therethough, spacing the distances between the projecting portions (e.g., axial locations of at least one male projection 44) and/or the pin and box end portions 20,30, 44' (i.e., spacing the distances between the internal upsets in the drill string component) to the selected separation distances disclosed herein can help to prevent undesired twisting of both the drill string component being used as a casing and the other drill string components being passed therethough.

In a further aspect, the substantially cylindrical portion 62 of the mid-body inner wall 42 and the overlying mid-body outer wall 62 can form a portion of a mid-body cylindrical wall having a substantially constant thickness that can have, in a plane bisecting the central longitudinal axis LA, a cross-sectional wall thickness of between about 1 percent and about 10 percent of the outer diameter of the mid-body outer wall. Further, it is contemplated that the cross-sectional wall thickness of each mid-body cylindrical wall can range between about 60 to about 80 percent of the cross sectional wall thickness of the at least projecting portion (e.g., each axial location of at least one male projection 44).

In an exemplary aspect, and not to be limiting, it is contemplated that for a nominal cross-sectional wall thickness of each mid-body cylindrical wall of about 0.155 inches, the respective thicknesses of the box and pin end portions 20, 30 can range from about 0.188 inches to about 0.25.

In one aspect, the inner diameter of each trough 60 proximate the at least one male projection, in any cross-sectional plane transverse to the central longitudinal axis LA, can be less than second inner diameter D2.

With continuing reference to the figures, which illustrate the box and pin end portions 20, 30 of the hollow body 10 of the drill string component or drill rod 100, it is contemplated that the box end portion can typically be located at the bit end of the drill rod. The box end portion 20 of the drill rod 100 can be configured to be coupled with additional drill rods or other drill components, such as a drill bit. In particular, in one example, the pin end portion 30 can be configured as and/or comprise a male-type interface that is configured to be coupled to a box end portion of a female-type interface in an associated drill component. The pin end portion 30 can also be configured to include external threading to facilitate coupling or communication with internal threading of an associated drill rod or other drill components. The box end portion 20 can also comprise any other external shaping that facilitates coupling with additional drill rods or other drill components. For example and without limitation, the box end portion 20 can be star-shaped, gear-shaped, hexagonally-shaped, and the like.

In exemplary aspects, the box end portion 20 can have a female thread defined therein and the pin end portion 30 can have a male thread positioned thereon that is configured to be complementarily received therein the female thread. Exemplary thread shapes include conventional thread shapes; Q and RQ thread shapes practiced by Applicant, and threads disclosed in Applicant's co-pending U.S. patent application Ser. Nos. 13/354,189, 13/717,885, and 14/026,611, which are incorporated by reference herein in their entirety.

In one aspect, the drill string component 100 can be manufactured from steel material. In one example, and not meant to be limiting, the drill string component 100 can be manufactured from a chromium molybdenum alloy steel grade such as AISI.SAE 4130 or modified versions thereof. In is contemplated that the drill string component 100 can be conventionally cold drawn and annealed to desired shape and material performance characteristics. It is contemplated that the as-drawn hardness of the cold drawn annealed tubing can be at least about 95 on the Rockwell Hardness B scale ("HRB"), which is typically between about 17 to 20 on the Rockwell Hardness C scale ("HRC").

In another aspect, it is contemplated that at least portions of the respective pin and box end portions 20, 30 and the at least one male projection 44 can be hardened to a desired surface hardness by conventional means, such as, for example and without limitation, by carburizing at least the end portion inner wall 22, 32 and/or male projection inner wall face 46 or by induction surface hardening of at least the end portion inner wall 22, 32 and/or male projection inner wall face 46 (by low frequency induction heating means followed immediately by cold quenching). In particular, in one or more implementations, the hardened portions of the at least the end portion inner wall 22, 32 and/or male projection inner wall face 46 can have a hardness between about 25 HRC to about 55 HRC. Optionally, the hardened portions can have a hardness between about 20 HRC and about 30 HRC or between about 30 HRC and about 40 HRC. In still further options, the hardened portions can have a hardness between about 35 HRC and about 45 HRC. One will appreciate that the hardened portions can be treated to include a hardness in a range between any of the above recited numbers. It is also contemplated that, optionally, the entirety of the portion of the respective pin and box end portions 20, 30 and/or the at least one male projection 44 can be heat treated to the desired hardness or only desired portions, such as, exemplarily, the inner faces, of the respective pin and box end portions and/or the at least one male projection can be heat treated to the desired hardness.

In another exemplary aspect, it is contemplated that the disclosed drill rods and other drill string components can have characteristics as set forth in the following table. The first column of the chart gives the characteristics of conventional drill rods, whereas the second and third columns give exemplary characteristics of drill rods having of drill string component of the present disclosure:

|  | Conventional Drill Rod | Single Male Projecting Portion FIG. 2 | Two Male Projecting Portion FIGS. 3, 4 |
| --- | --- | --- | --- |
| Outer Diameter (inches) | 3.5 | 3.5 | 3.5 |
| Inner Diameter (minimum, inches) | 3.0625 | 3.0625 | 3.0625 |
| Inner Diameter (trough, inches) | — | 3.188 | 3.188 |
| End Length (inches) | — | 8 | 8 |
| Transition Length (inches) | — | 2.4 | 1.75 |
| Calculated Angle β (degrees) | — | 1.50 | 2.05 |
| Overall Length (inches) | 122 | 122 | 122 |
| Number of Mid-body Projecting Portions (with at least one male projection) | 0 | 1 | 2 |
| Male Projection Length (inches) | — | 3 | 2.5 |
| Total Transition Length (inches) | — | 9.6 | 10.5 |
| Total Trough Length (inches) | — | 93.4 | 90.5 |
| Total Weight | 78.68 lbs. | 61.39 lbs. | 61.82 lbs. |
| Total Weight Reduction | — | 22% | 21.4% |

Exemplary Aspects

In various exemplary aspects, disclosed herein is a threaded drill string component that resists mid-body twisting, comprising: a hollow body having a box end portion, an opposing pin end portion, and a central longitudinal axis extending through the hollow body, wherein each of the box end portion and the opposing pin end portion have an end portion inner wall having a first inner diameter; the hollow body further comprising a cylindrical mid-body portion that extends longitudinally between the respective box and pin end portions and has a mid-body inner wall having a variable wall diameter and a mid-body outer wall having a substantially constant outer diameter, the mid-body portion further comprising: at least one projecting portion spaced from both the box and pin end portions and extending inwardly toward the central longitudinal axis, wherein each projecting portion comprises at least one male projection having a male projection inner wall face having an second inner diameter, wherein the second inner diameter is equal to or greater than the first inner diameter; and a plurality of troughs defined in the mid-body inner wall of the mid-body portion, wherein a first trough of the plurality of troughs extends from a distal end of the box end portion to a proximal end of the at least one projecting portion and wherein a second trough of the plurality of troughs extends from a distal end of the projecting portion to a proximal end of the pin end portion, wherein each trough comprises a substantially cylindrical portion having a first trough diameter that is greater than the respective first and second inner diameters and a first frustoconical portion that is sloped outwardly from the central longitudinal axis and extends between the respective distal end of the box end portion and the proximal end of the pin end portion to the substantially cylindrical portion and has a variable inner diameter that is greater than the first inner wall diameter, wherein the substantially cylindrical portion of the mid-body inner wall and the overlying mid-body outer wall form a portion of a mid-body cylindrical wall having a substantially constant thickness and wherein, in a plane bisecting the central longitudinal axis, the cross-sectional thickness of each mid-body cylindrical wall has a wall thickness of between about 1 percent and about 10 percent of the outer diameter of the mid-body outer wall.

In another exemplary aspect, the end portion inner wall has a substantially cylindrical shape that is positioned uniformly about the central longitudinal axis.

In another exemplary aspect, the male projection inner wall face has a substantially cylindrical shape that is positioned uniformly about the central longitudinal axis.

In another exemplary aspect, the inner diameter of each trough proximate the at least one male projection of each projecting portion, in any cross-sectional plane transverse to the central longitudinal axis, is less than the second inner diameter.

In another exemplary aspect, a portion of each trough adjacent to the at least one male projection of each projecting portion, comprises a second frustoconical portion that is sloped inwardly from the central longitudinal axis and extends between the substantially cylindrical portion of the mid-body portion and an edge of the male projection inner wall face. In another exemplary aspect, at least a portion of each second frustoconical portion is linear in longitudinal cross-section and is positioned at an acute angle β with respect to the central longitudinal axis. Optionally, in another exemplary aspect, the acute angle β is less than about 6 degrees. Optionally, in another exemplary aspect, a transition from the second frustoconical portion to the male projection inner wall face is chamfered. Optionally, in another exemplary aspect, a transition from the second frustoconical portion to the adjoining cylindrical portion of the mid-body portion of the trough is chamfered. Optionally, in another exemplary aspect, at least a portion of each second frustoconical portion is curvilinear in longitudinal cross-section.

In another exemplary aspect, a transition from each first frustoconical portion of each trough to the adjoining respective distal end of the box end portion and proximal end of the pin end portion is chamfered. In another exemplary aspect, the pin end portion has a male thread positioned thereon, the male thread configured to be complementarily received therein the female thread.

In another exemplary aspect, the box end portion has a female thread defined therein.

In another exemplary aspect, the at least one projecting portion comprises a single projecting portion positioned substantially in a center of the mid-body portion. Optionally, in another exemplary aspect, the male projections of the single projecting portion are longitudinally spaced from the box and pin end portions by a separation distance that is less than about five feet.

In another exemplary aspect, the at least one projecting portion comprises a plurality of projecting portions that are spaced longitudinally along the mid-body portion. Optionally, in another exemplary aspect, the plurality of projecting portions are equidistantly spaced longitudinally along the mid-body portion. Optionally, in another exemplary aspect, the plurality of troughs comprises at least one trough that extends between any two spaced projecting portions. Optionally, in another exemplary aspect, the male projections of sequential projecting portions are longitudinally spaced from one another by a separation distance that is less than about five feet.

In another exemplary aspect, at least a portion of each first frustoconical portion is linear in longitudinal cross-section.

In another exemplary aspect, at least a portion of each first frustoconical portion is curvilinear in longitudinal cross-section. Optionally, in another exemplary aspect, at least a portion of each first frustoconical portion has a quarter sine wave shape in longitudinal cross-section with an amplitude equal to one-half of the first trough diameter. Optionally, in another exemplary aspect, each first frustoconical portion has a quarter sine wave shape in longitudinal cross-section with an amplitude equal to one-half of the first trough diameter.

In another exemplary aspect, at each second frustoconical portion, the inner diameter of the hollow body transitions from the first inner diameter of the respective box and pin end portions to the first trough diameter along a second longitudinal transition length, and wherein, at each first frustoconical portion, the inner diameter of the hollow body transitions from the second inner diameter of the male projection inner wall face to the first trough diameter along a second longitudinal transition length, and wherein the total of the respective first and second transition lengths is less than about 10% of the overall length of the drill string component.

In another exemplary aspect, the drill string component comprises a drill rod.

In another exemplary aspect, at least a portion of the substantially cylindrical portion of each trough further comprises a plurality of longitudinally extending ridges that extend inwardly toward the central longitudinal axis.

In another exemplary aspect, the plurality of troughs comprise greater than 60% of the elongate length of the mid-body portion.

In another exemplary aspect, the plurality of troughs comprise greater than 70% of the elongate length of the mid-body portion.

In another exemplary aspect, the plurality of troughs comprise greater than 80% of the elongate length of the mid-body portion.

In another exemplary aspect, at least a portion of the respective pin and box end portions and the at least one male projection can be hardened to a desired surface hardness, and wherein the desired surface hardness is between about 35 HRC and about 45 HRC.

The present invention can thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A threaded drill string component that resists mid-body twisting, comprising:
   a hollow body having a box end portion, an opposing pin end portion, and a central longitudinal axis extending through the hollow body, the hollow body further comprising a mid-body portion that extends longitudinally between the respective box and pin end portions and has a mid-body inner wall and a mid-body outer wall, the mid-body portion further comprising:
   at least one projecting portion spaced from both the box and pin end portions and extending inwardly toward the central longitudinal axis, wherein each projecting portion comprises at least one male projection having a male projection inner wall face; and
   a plurality of troughs defined in the mid-body inner wall of the mid-body portion, wherein a first trough of the plurality of troughs extends from a distal end of the box end portion to a proximal end of the at least one projecting portion and wherein a second trough of the plurality of troughs extends from a distal end of the projecting portion to a proximal end of the pin end portion, wherein the mid-body outer wall has a substantially constant outer diameter.

2. The drill string component as recited in claim 1, wherein each of the box end portion and the opposing pin end portion have an end portion inner wall, and wherein the end portion inner wall has a substantially cylindrical shape that is positioned uniformly about the central longitudinal axis.

3. The drill string component as recited in claim 1, wherein the male projection inner wall face has a substantially cylindrical shape that is positioned uniformly about the central longitudinal axis.

4. The drill string component of claim 1, wherein each trough comprises a substantially cylindrical portion and a first frustoconical portion that is sloped outwardly from the central longitudinal axis and extends between the respective distal end of the box end portion and the proximal end of the pin end portion to the substantially cylindrical portion and has a variable inner diameter.

5. The drill string component as recited in claim 4, wherein a portion of each trough adjacent to the at least one male projection of each projecting portion, comprises a second frustoconical portion that is sloped inwardly from the central longitudinal axis and extends between the substantially cylindrical portion of the mid-body portion and an edge of the male projection inner wall face.

6. The drill string component as recited in claim 5, wherein at least a portion of each second frustoconical portion is linear in longitudinal cross-section and is positioned at an acute angle β with respect to the central longitudinal axis.

7. The drill string component as recited in claim 6, wherein the acute angle β is less than about 6 degrees.

8. The drill string component as recited in claim 6, wherein a transition from the second frustoconical portion to the male projection inner wall face is chamfered.

9. The drill string component as recited in claim 8, wherein a transition from the second frustoconical portion to the adjoining cylindrical portion of the mid-body portion of the trough is chamfered.

10. The drill string component of claim 4, wherein the substantially cylindrical portion of the mid-body inner wall and the overlying mid-body outer wall form a portion of a mid-body cylindrical wall having a substantially constant thickness.

11. The drill string component of claim 4, wherein at least a portion of the substantially cylindrical portion of each trough further comprises a plurality of longitudinally extending ridges that extend inwardly toward the central longitudinal axis.

12. The drill string component as recited in claim 1, wherein the pin end portion has a male thread positioned thereon, and wherein the box end portion has a female thread defined therein.

13. The drill string component as recited in claim 1, wherein the at least one projecting portion comprises a single projecting portion positioned substantially in a center of the mid-body portion.

14. The drill string component as recited in claim 1, wherein the at least one projecting portion comprises a plurality of projecting portions that are spaced longitudinally along the mid-body portion.

15. The drill string component as recited in claim 14, wherein the plurality of troughs comprises at least one trough that extends between any two spaced projecting portions.

16. The drill string component as recited in claim 1, wherein the drill string component comprises a drill rod.

17. The drill string component of claim 1, wherein the plurality of troughs comprise greater than 60% of the elongate length of the mid-body portion.

18. The drill string component of claim 13, wherein the male projections of the single projecting portion are longitudinally spaced from the box and pin end portions by a separation distance that is less than about five feet.

19. The drill string component of claim 14, wherein the male projections of sequential projecting portions are longitudinally spaced from one another by a separation distance that is less than about five feet.

20. The drill string component of claim 1, wherein the drill string component is a single drill rod.

* * * * *